United States Patent [19]
Lester et al.

[11] Patent Number: 6,125,180
[45] Date of Patent: *Sep. 26, 2000

[54] DURABLE TELEPHONE WITH NO MOVING PARTS

[75] Inventors: Leland Lester; David Iglehart, both of Austin; Larry W. Coons, Cedar Park; Michael Duncan, Austin, all of Tex.

[73] Assignee: Siemens Information and Communication Networks, Inc., Boca Raton, Fla.

[*] Notice: This patent issued on a continued prosecution application filed under 37 CFR 1.53(d), and is subject to the twenty year patent term provisions of 35 U.S.C. 154(a)(2).

[21] Appl. No.: 09/010,810
[22] Filed: Jan. 22, 1998
[51] Int. Cl.[7] ....................................... H04M 1/00
[52] U.S. Cl. ............................. 379/433; 379/368
[58] Field of Search ..................... 379/433, 428, 379/368; 455/90, 575, 556; 341/31, 22; 345/173–177

[56] References Cited

U.S. PATENT DOCUMENTS

| | | | |
|---|---|---|---|
| 5,189,632 | 2/1993 | Paajanen | 455/556 |
| 5,477,223 | 12/1995 | Destremps | 341/31 |
| 5,517,683 | 5/1996 | Collett et al. | 455/90 |

*Primary Examiner*—Jack Chiang

[57] ABSTRACT

A telephone utilizes a grid of light beams to generate signals that are unique to particular key regions of the telephone in response to interruptions of light beams that intersect at the particular key regions. The key regions of the telephone are arranged in a matrix of rows and columns and the light grid includes horizontally and vertically oriented pairs of light sources and photo detectors that have respective light beam paths passing through rows and columns of key regions. The intersection points of one of the horizontal and vertical light beam paths correspond to particular key regions. In one embodiment, the light sources and photo detectors are raised from a surface of the support structure such that the light beam paths cross the matrix of key regions at the exterior of the support structure. In another embodiment, the telephone generates DTMF signals in response to interruptions of the intersecting light beams, and the telephone has holes formed completely through the support structure at the key regions where the light beam paths intersect.

12 Claims, 3 Drawing Sheets

DURABLE TELEPHONE WITH NO MOVING PARTS

BACKGROUND OF THE INVENTION

The invention relates to telephones and more particularly to user interface mechanisms on telephonic devices.

DESCRIPTION OF THE RELATED ART

Telephones exist in all shapes and sizes and utilize different techniques to allow a user to interact with the telephone. The most widely recognized technique involves the use of a handset that includes a microphone and a receiver and the use of a base unit that has push buttons. To activate a function on a telephone, one of the buttons is mechanically depressed and the corresponding function is triggered. The pushing of a button onto an associated contact point within the base unit of the telephone causes the depression to be recognized by the triggering circuitry.

A different technique for activating a computer keyboard is disclosed in U.S. Pat. No. 5,477,223, entitled "Finger Activated Keyboard for a Computer," issued to Destremps. Destremps discloses a computer keyboard used to reduce repetitive motion stress syndrome in which each key includes a light source and a photo detector in a region such as a depression in a key support structure. A key signal is activated by an operator upon inserting a finger into the appropriate depression, thereby interrupting a light beam that projects across the depression. In another embodiment, the key support structure is a pair of closely spaced, parallel panels having an array of keyholes formed in the top panel. Arrays of light detectors and light sources are mounted on the bottom panel. When the panels are assembled together, a light source-detector pair is associated with each keyhole such that a light beam propagating through a keyhole from the associated light source to the associated light detector will be interrupted when the user inserts a finger into the keyhole.

With regard to telephones, a problem exists with the durability of telephones, especially public pay telephones and military telephones. Public pay telephones and military telephones are often subject to harsh physical and environmental conditions. For example, public pay telephones may be physically abused, resulting in broken push buttons and torn-off handsets. Similarly, in military situations telephones may be subject to sometimes unavoidable physical abuse that damages the telephone. Environmental conditions that may cause damage to a telephone include exposure to rain, cold, extreme heat, chemical exposure, or possibly explosive environments.

In addition to concerns relating to durability, telephones are susceptible to malfunctions caused by a lack of cleanliness since telephones require human contact to operate. Moreover, in situations such as a hospital environment, human contact with a telephone may spread dangerous germs onto the telephone, allowing the transfer of the germs to a subsequent user. When telephones are used in ultra-clean high-tech applications, cleanliness of telephones is also a problem because dust and other contaminants can accumulate in the cracks and crevices that are created at the interface of moving telephone parts such as push buttons allowing the contaminants to be released into an otherwise generally particle-free environment.

What is needed is a durable telephone that can withstand harsh physical and environmental conditions. In addition, what is needed is a clean telephone that does not transmit dangerous germs and that does not enable the accumulation of dust and contaminants.

SUMMARY OF THE INVENTION

A telephone with no moving parts utilizes a grid of light beams to generate signals that are unique to particular key regions of the telephone in response to interruptions of light beams that intersect at the particular key regions. More specifically, the key regions of the telephone are arranged in a matrix of rows and columns and the light grid includes first light beam paths formed by a group of first pairs of light sources and photo detectors that are in a generally parallel arrangement, with each first light beam path passing through a row of key regions. The light grid also includes second light beam paths formed by a group of second pairs of light sources and photo detectors that are in a generally parallel arrangement, with each second light beam path passing through a column of key regions, wherein the first and second pairs are arranged perpendicularly to each other such that the intersection of one of the first light beam paths with one of the second light beam paths is identifiable with a particular key region.

In one embodiment, the telephone generates signals in response to interruptions of the first and second light beams where the first and second pairs of light sources and photo detectors are raised from a surface of the support structure such that the first and second light beam paths cross the matrix of key regions at the exterior of the support structure. In another embodiment, the telephone generates DTMF or other telephony signals in response to interruptions of the first and second light beams and the telephone has holes formed completely through the support structure at the key regions where the light beam paths intersect.

DETAILED DESCRIPTION

Figure 1:
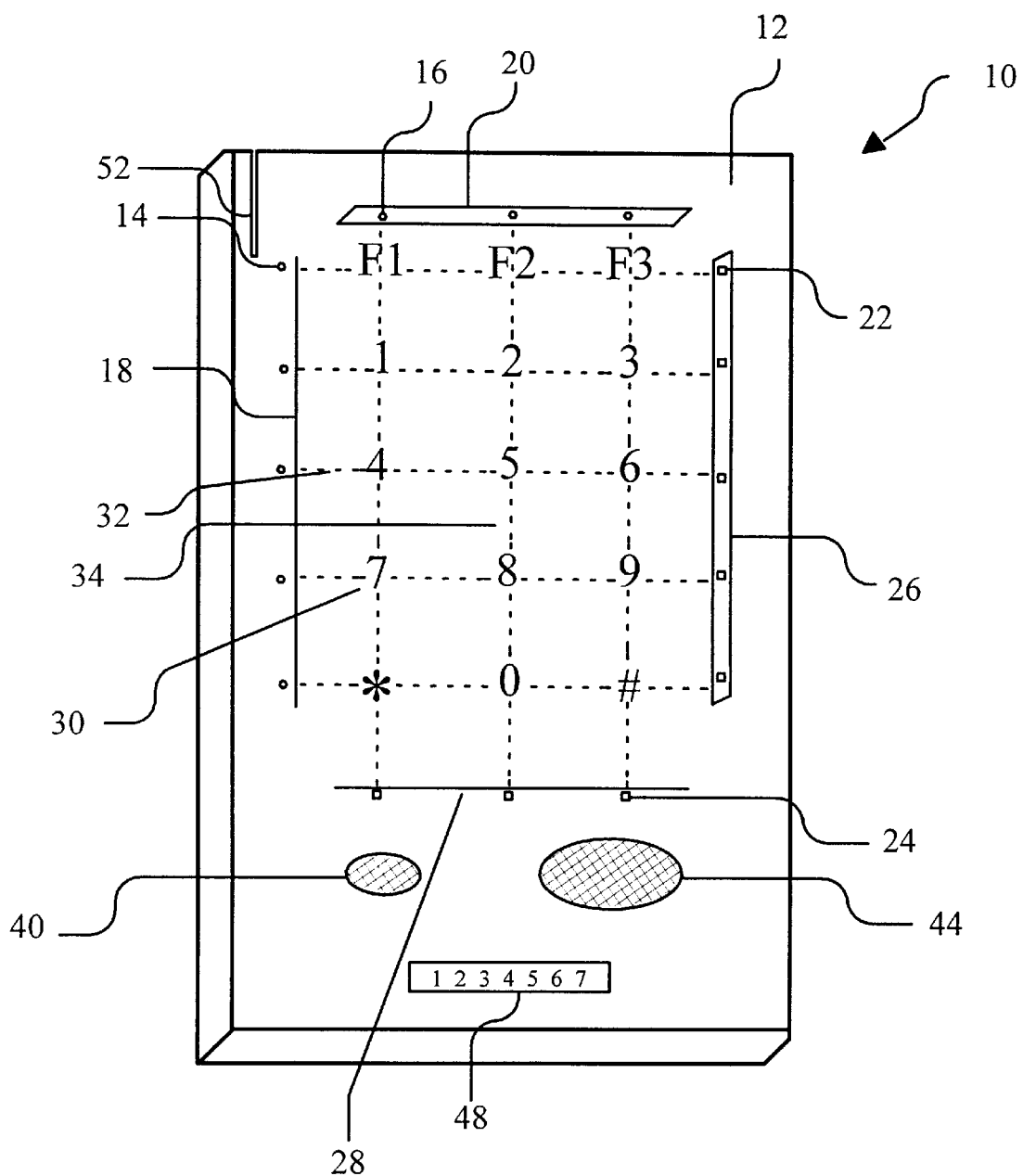
FIG. 1 is a perspective view of a telephone utilizing an infrared grid in accordance with a first embodiment of the present invention.

FIG. 1 is a depiction of a telephone in accordance with the invention. The telephone 10 utilizes an optical grid system to create key activation regions. The optical grid system is formed by light source and photo detector pairs. The light sources 14 and 16 are formed in raised banks 18 and 20 that allow the light sources to project light beams above a support structure 12 of the telephone and over the key regions 30 identified by their respective function symbols. The photo detectors 22 and 24 are formed in reciprocal raised banks 26 and 28 that allow the photo detectors to detect light beams that are projected from the corresponding light sources.

The horizontally oriented light sources 14 and photo detectors 22 generate horizontal light beams that project across parallel rows of key regions 30, creating a uniquely identifiable source/detector "circuit" along each row. The vertically oriented light sources 16 and photo detectors 24 generate vertical light beams that project across parallel columns of key regions, creating a uniquely identifiable source/detector circuit along each column. The intersections of the horizontal light beams and the vertical light beams correspond to the locations of key regions.

Figure 2:
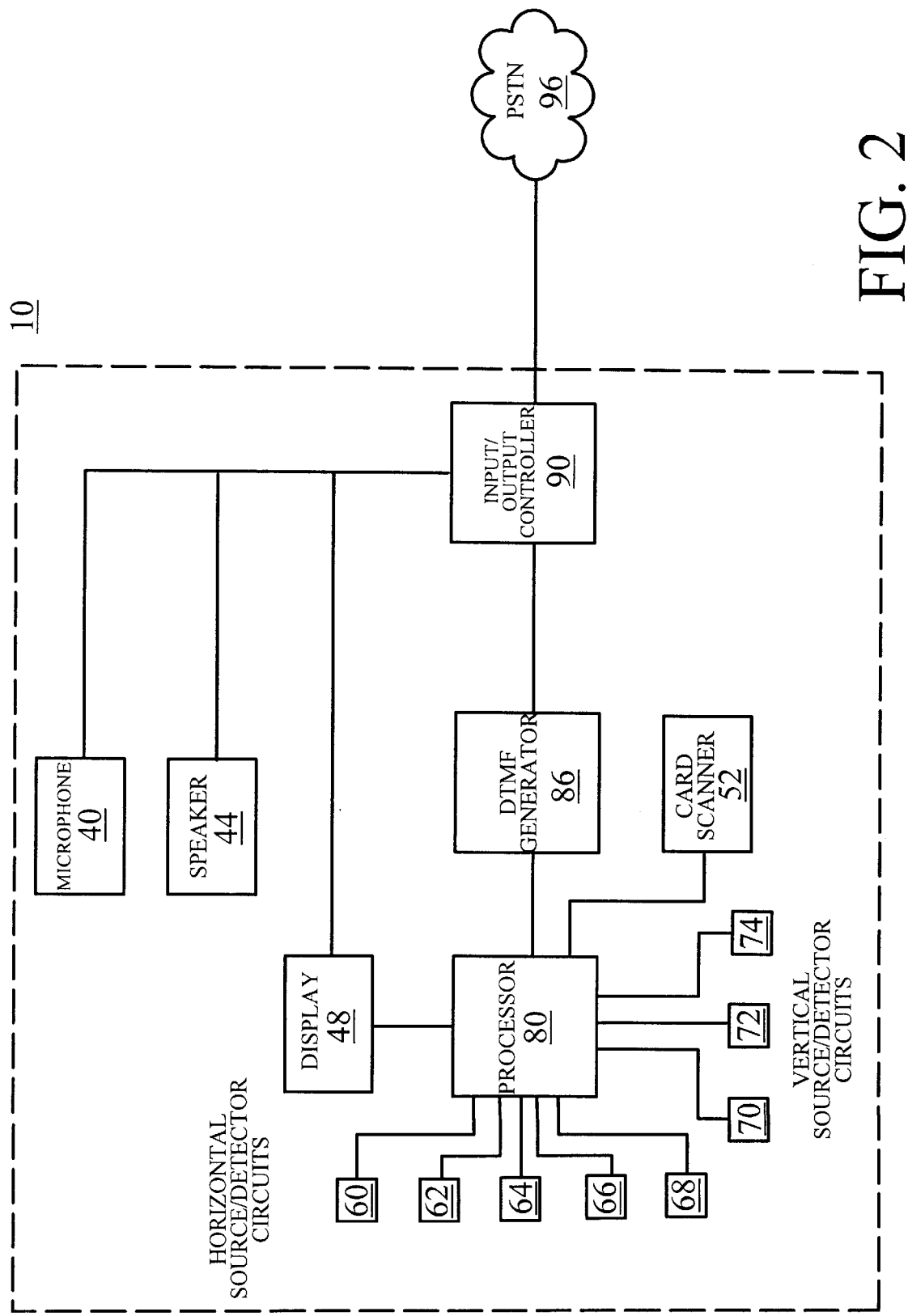
FIG. 2 is a block diagram of the components within the telephone of FIG. 1.

FIG. 2 is a block diagram of the components within the telephone 10 of FIG. 1. As described above, the key regions are arranged in a horizontal and vertical coordinate system and each key region is defined by the intersection of two source/detector circuits. The five horizontal source/detector circuits of FIG. 1 are depicted by elements 60, 62, 64, 66, and 68 and the three vertical source/detector circuits are depicted by elements 70, 72, and 74.

Each source/detector circuit 60–74 operates independently to generate a designated signal when the circuit is interrupted. In a normal, uninterrupted state, the light source 14 of, for example, a horizontal source/detector circuit 60 projects a light beam across a row of key regions to a corresponding photo detector 22 of the source/detector circuit. The photo detector senses the light beam from the light source and generates a signal that represents a closed circuit, indicating that the particular beam has not been interrupted. When the light beam is interrupted, light does not contact the photo detector and the photo detector generates a signal that represents an open circuit. Typically, the open circuit signal is a logical low of zero volts.

The processor 80 is electrically connected to each source/detector circuit 60–74 and is able to sense and interpret the signals that are received from each source/detector circuit. The processor is capable of determining what key was triggered by combining the simultaneous signals received from the interruption of a horizontal and a vertical source/detector circuit. The processor can transmit signals reflecting the triggered keys to other components within the telephone.

A dual tone multi-frequency (DTMF) generator 86 is electrically connected to the processor 80. The DTMF generator creates telephone system compatible DTMF signals representative of different key functions in response to signals from the processor. The DTMF signals are typically transmitted through an input/output controller 90 to a publicly switched telephone network (PSTN) 96. The input/output controller is a conventional telephone input/output controller.

In operation, a light beam, preferably an infrared light beam, is continuously transmitted from each light source 14, 16 to each corresponding photo detector 22, 24, creating a light grid of uniquely identifiable source/detector circuits that have intersecting light beams corresponding to the identified key regions. As long as light from a particular light source is received at the corresponding photo detector, the source/detector circuit is closed and no key that is located in the corresponding row or column is triggered. If a light beam is broken, for example by a finger blocking the beam, then the source/detector circuit goes into an open condition, signifying to the processor 80 that a key region within a particular row or column has been selected. Since the light beams intersect to create a grid system, the processor 80 can easily associate a specific key with the interruption of a particular row and a particular column of light beams. For example, when a finger is placed in the key region for the number "5," the middle row light beam 32 and the middle column light beam 34 are momentarily broken. By combining open circuit signals from the row and column, a unique key region is identified by the processor and the DTMF generator 86 is activated. The DTMF generator generates the appropriate telephone or other telephony compatible signals that are delivered to the PSTN 96. Although infrared light is preferred, other light technologies may be used instead of or along with infrared light.

In a preferred embodiment of the telephone 10, a microphone 40, a speaker 44, a display device 48, and a card scanner 52 are incorporated into the telephone. Referring to FIG. 2, the speaker and microphone are conventional devices that are electrically connected to the input/output controller 90 of the telephone. Referring to FIG. 1, the speaker and microphone are physically integrated into the support structure 12 of the telephone so that no moving parts are accessible at the outer surface of the support structure.

The display device 48 is a conventional device that is electrically connected to the processor 80 and the input/output controller 90. The display device can display alphanumeric characters in order to provide more information to a user. For example, the device may be a liquid crystal display (LCD). The card scanner 52 is a conventional card scanner that is electrically connected to the processor and has a physical slot for inserting a data card having information encoded onto the card. When a data card is inserted into the slot, the encoded information is transferred to the telephone. The data card may be, for example, a telephone calling card or a credit card. Typically, the data card contains data in magnetic form, but that is not critical to the invention. As with the microphone 40, speaker 44, and display device 48, the card scanner 52 is integrated into the support structure 12 of the telephone 10 such that no moving parts are accessible from the surface of the support structure.

The support structure 12 and all of the devices formed within the support structure are assembled such that contiguous parts of the telephone 10 form an environmental seal. For example, at the interface of the microphone 40 and the support structure, a tight seal is formed that prevents elements such as rain from penetrating into the internal cavity of the telephone. In addition, tight seals at the interface of contiguous parts of the telephone prevent sharp objects, such as knives and screwdrivers, from being pried into crevices of the telephone in order to vandalize the telephone.

Preferably, the support structure 12 of the telephone 10 is made of a rugged and durable material such as a hard plastic or metal. The combination of the above-identified features creates a durable telephone with no moving parts, so that the telephone can withstand harsh conditions. The telephone may be a portable telephone, or a wall mounted telephone, or any other type of telephone.

An example of a typical interaction with the durable telephone 10 is discussed in the situation in which the telephone is used as a public pay telephone. A user of the public pay telephone first inserts a data card, typically a telephone calling card or a credit card, into the slot of the card scanner 52. Once the user's card has been read and approved, the telephone is activated and the user begins to enter the desired telephone number. The user enters the desired telephone number on the telephone by successively placing a finger in the key regions 30 corresponding to the desired number sequence. Placing a finger in one of the key regions breaks the light beams that intersect at the key region, signaling the processor 80 and subsequently activating the DTMF generator 86 to generate a signal representative of the desired key. The numbers that are triggered by the user are displayed on the display device 48 for the user. Identical to operation of a conventional telephone, after the desired call is successfully connected, the user talks into the microphone 40 to communicate with the called party and the user listens to the called party through the speaker 44. At the termination of the call, the user places a finger in an identified function key region such as the key region "F3" and the user is disconnected. The entire interaction by the user of the telephone is completed without requiring any moving parts.

In an alternative embodiment of the telephone 10, instead of placing the pairs of light sources 14,16 and photo detectors 22, 24 above the surface of the support structure in raised banks 18, 20, 26, and 28 respectively, the light sources and photo detectors are located just below the surface of the support structure 12. The key regions 30 are formed by creating depressions in the support structure which allow light beams to pass through the depressions. To activate a key region in this embodiment, a user places a finger into a depression corresponding to the appropriate key. The finger inserted into the depression breaks the light paths that intersect at the depression, triggering the appropriate key.

Figure 3:
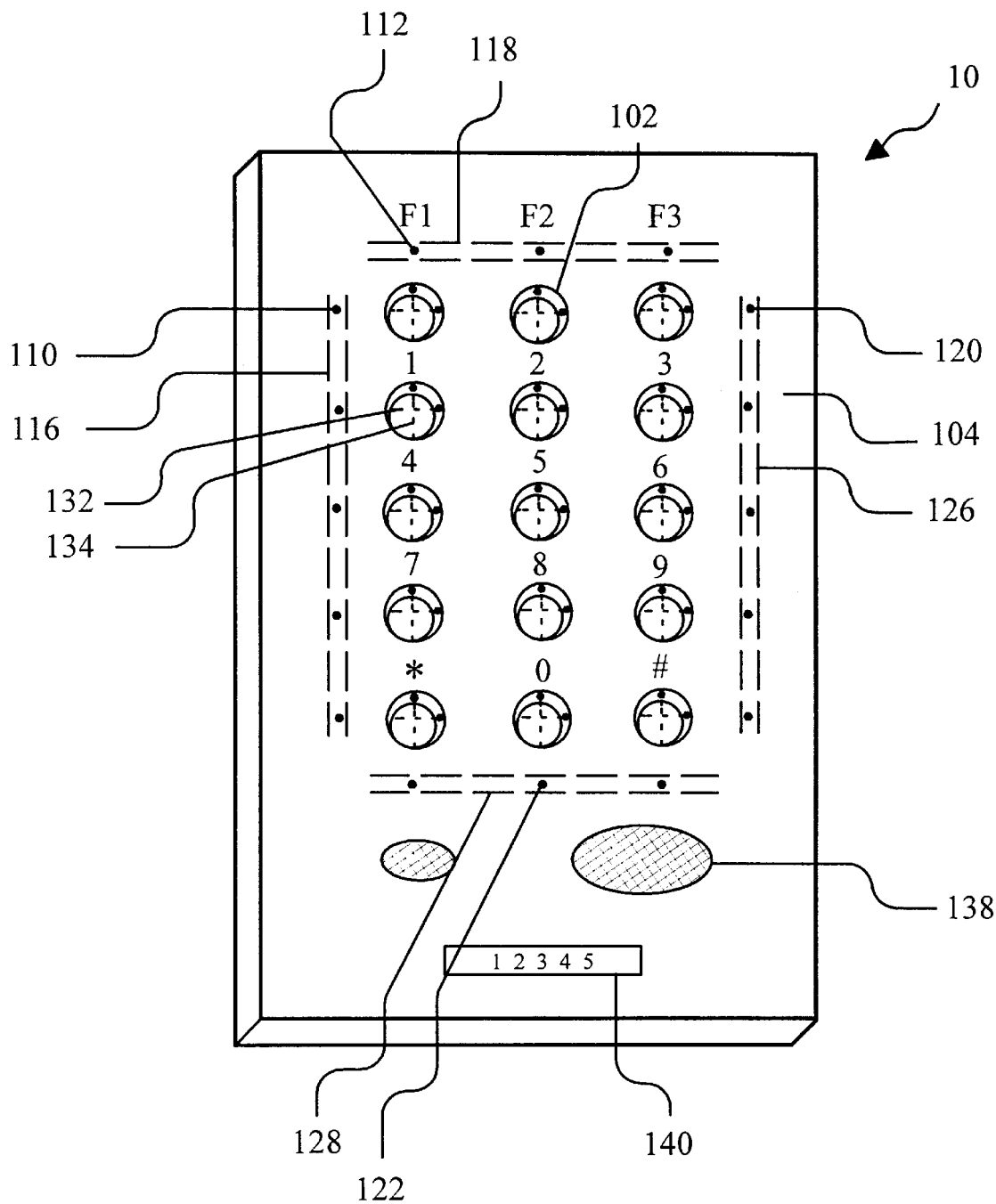
FIG. 3 is a perspective view of a telephone utilizing an infrared grid and keyholes in accordance with a second embodiment of the present invention.

FIG. 3 is a depiction of another telephone in accordance with the invention. Preferably, the telephone 100 is a wall mounted telephone that utilizes an array of holes and an optical grid system similar to the system of FIGS. 1 and 2 to create key regions that activate a DTMF generator to generate corresponding signals. The holes 102 pass completely through the support structure 104 of the telephone and are sufficiently large to allow a user to insert a finger into a hole without physically contacting the telephone. The optical grid system is formed by light source 110, 112 and photo detector 120,122 pairs that are embedded within the support structure of the telephone. The light sources are formed in embedded banks 118, 116 and are aligned with small diameter passageways in the circumferential walls of the holes to allow the light sources to project light beams through the circumferential walls of the support structure to the corresponding photo detectors. Each hole is intersected by four passageways that are spaced apart from each other at 90° increments. Thus, opposite passageways are axially aligned. The photo detectors 120, 122 are located in embedded banks 126, 128 that allow the photo detectors to detect light beams that are projected from the corresponding light sources through the light passageways.

The horizontally oriented light sources 110 and photo detectors 120 have horizontal light beam paths 132 that project through the interior of the support structure 104 and through a row of holes. The vertically oriented light sources 112 and photo detectors 122 have vertical light beam paths 134 that project through the interior of the support structure and through a column of holes. The intersections of the horizontal light beam paths and the vertical light beam paths correspond to the locations of the holes and identify the key regions. The particular functions of key region holes are identified by symbols that are formed in a visible manner above the corresponding key regions.

In operation, a light beam, preferably an infrared light beam, is continuously transmitted from each light source 110, 112 to each corresponding photo detector 120,122. As long as light is received at the corresponding photo detectors, the source/detector circuits are closed and the corresponding key regions are not activated. If a finger is inserted into a key region hole, two intersecting light beams are blocked and the corresponding source/detector circuits enter into an open condition, signifying to the processor 80 that a particular row and column have been identified. Since the light beams intersect at the key regions to create a grid system, the processor is programmed to associate a specific key with the breaking of a particular row and a particular column of light beams. For example, when a finger is placed in a hole for a particular number, two intersecting light beams are broken, one horizontal light beam and one vertical light beam. By breaking the intersecting light beams, a particular key region is identified by the processor and the DTMF generator 86 generates a signal associated with the particular key region. Because the key region holes are larger than a finger and project completely through the support structure, an operator can interact with the telephone without ever physically contacting the telephone.

In an alternative embodiment, the key holes 102 do not project completely through the support structure 104, but still allow enough of an opening so that a finger can be inserted into a hole, activating the key yet not contacting the support structure. In another alterative embodiment, the telephone may be a portable hand-held telephone with the same light grid and key region configuration.

In a preferred embodiment of the telephone 100, a microphone 136, a speaker 138, and a display device 140 are incorporated into the telephone. The speaker and microphone are conventional devices that are integrated into the circuitry and the support structure of the telephone so that no moving parts are accessible from the outer surface of the support structure. The display device is a conventional display device that can display alphanumeric characters in order to provide more information to a user. The display device is integrated into the support structure such that no moving parts are accessible from the surface of the support structure.

The support structure 104 of the telephone 100 and all of the devices formed within the support structure are assembled together such that all of the contiguous parts of the telephone are environmentally sealed, as described with reference to the telephone of FIG. 1. In addition, the telephone is designed such that cracks and crevices that may enable the buildup of germs and/or other contaminants are minimized. The telephone support structure is a generally continuous smooth surface that is easily cleanable.

An example of a typical interaction with a clean telephone 100 is discussed in the situation in which the telephone is used in a hospital. A user of the telephone activates the telephone by inserting a finger into a designated key region hole 102, e.g., the hole designated "F2." Once activated, the user enters a desired telephone number by successively inserting a finger into the key region holes corresponding to the desired numbers. Placing a finger in a key region hole breaks the light paths that intersect at the key region hole, opening the corresponding source/detector circuits and triggering the desired activity, e.g., generating a particular DTMF signal. The numbers activated by the user are displayed on the display device 140 for the user. Once the desired call is successfully connected, the user can conduct the call using the microphone 136 and the speaker 138. The user ends the call by inserting a finger in a designated key region hole, e.g., the hole designated "F3." With a wall mounted telephone, the entire interaction can be completed without the user physically contacting the telephone. Avoiding contact with the telephone in a hospital setting minimizes the transfer of dangerous germs through contact with the telephone.

What is claimed is:

1. A telephone comprising:

a telephone body having a support structure means for defining a matrix of key regions; and a light grid means for generating a pattern of light beams having intersections at said key regions and for generating signals that are unique to particular key regions in response to interruptions of light beams that intersect at said particular key regions, said light grid means being arranged such that said pattern of light beams intersect at the exterior of said telephone body.

2. The telephone of claim 1 wherein said matrix of key regions is arranged in rows and columns along said support structure means, and wherein said light grid means includes:

a plurality of first pairs of light sources and photo detectors, said first pairs being in a generally parallel arrangement and being spaced apart such that parallel first light beam paths are formed from said light sources to said photo detectors, each first light beam path passing through a row of said key regions;

a plurality of second pairs of light sources and photo detectors, said second pairs being in a generally parallel arrangement and spaced apart such that parallel second light beam paths are formed between said light sources and said photo detectors, each second light beam path passing through a column of said key regions; and wherein said first and second pairs are arranged perpendicularly to each other such that each intersection of one of said first light beam paths with one of said second light beam paths is identifiable with a particular key region of said matrix of key regions.

3. The telephone of claim 2 wherein said support structure means has a seal between contiguous parts of said support structure means to separate an internal cavity of said support structure means from outside environmental conditions.

4. The telephone of claim 2 wherein each key region of said matrix of key regions is a depression in a surface of said support structure means.

5. The telephone of claim 4 further comprising a microphone and a speaker integrated into said support structure means, both said microphone and said speaker having an absence of moving parts that are external to said support structure means.

6. The telephone of claim 5 further comprising a display integrated into said support structure means, said display having cells that activate in response to display signals to form alphanumeric characters, at least some of said display signals being generated in response to detection of interruptions of said light beams.

7. The telephone of claim 2 wherein:

at least some of said signals that are generated in response to interruptions of said first and second light beams are dual tone multi-frequency (DTMF) signals; and said support structure means includes a support structure that has holes that are configured to be completely through said telephone body at said matrix of key regions.

8. The telephone of claim 7 further comprising a microphone and a speaker integrated into said support structure, both said microphone and said speaker having an absence of moving parts that are external to said support structure.

9. The telephone of claim 8 further comprising a data card scanner integrated into said support structure, said card scanner having a data card acceptable slot and no moving parts.

10. The telephone of claim 8 further comprising a display integrated into said support structure, said display having cells that activate in response to display signals to form alphanumeric characters, at least some of said display signals being generated in response to detection of interruptions of said light beams.

11. The telephone of claim 8 wherein said support structure has seals between contiguous parts of said support structure to separate an internal cavity of said support structure from outside environmental conditions.

12. A telephone with no external moving parts comprising:

a body structure having holes completely through said body structure that define key regions, said body structure having inner walls that form boundaries of said holes;

first and second banks of light sources embedded at right angles within said body structure;

third and fourth banks of photo detectors embedded at right angles within said body structure, said first and second banks being respectively located opposite to said third and fourth banks such that light beam paths from said light sources are aligned with locations of said photo detectors, wherein said light beam paths from light sources travel through passageways in said inner walls that form said boundaries of said holes and intersect at said holes that define said key regions;

a DTMF generator connected to said photo detectors, said DTMF generator having a DTMF output that is responsive to detection that one of said light beam paths to said third bank and one of said light beam paths to said fourth bank have been interrupted;

a microphone integrated into said body structure; and a speaker integrated into said body structure.

* * * * *